Patented Feb. 27, 1940

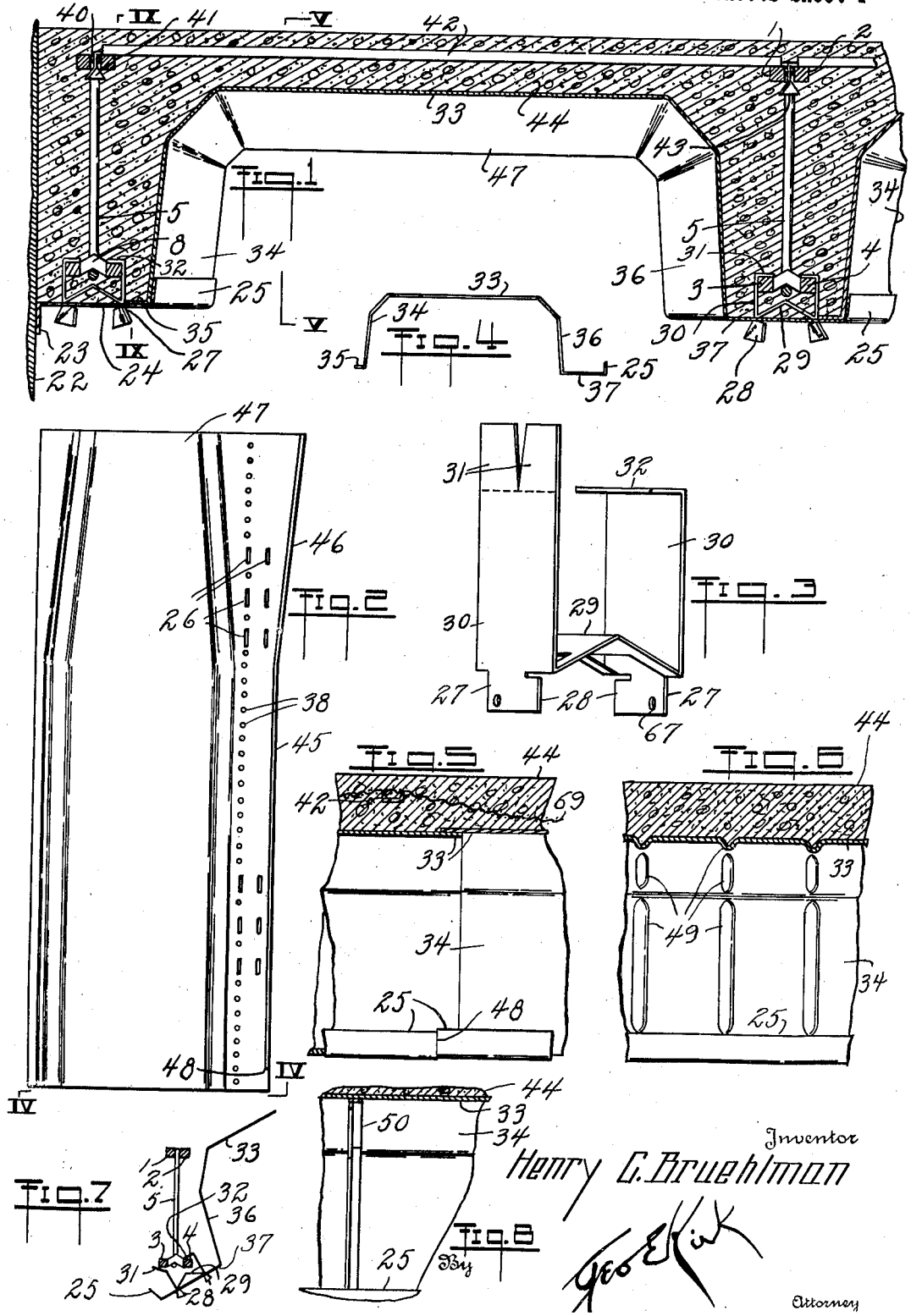

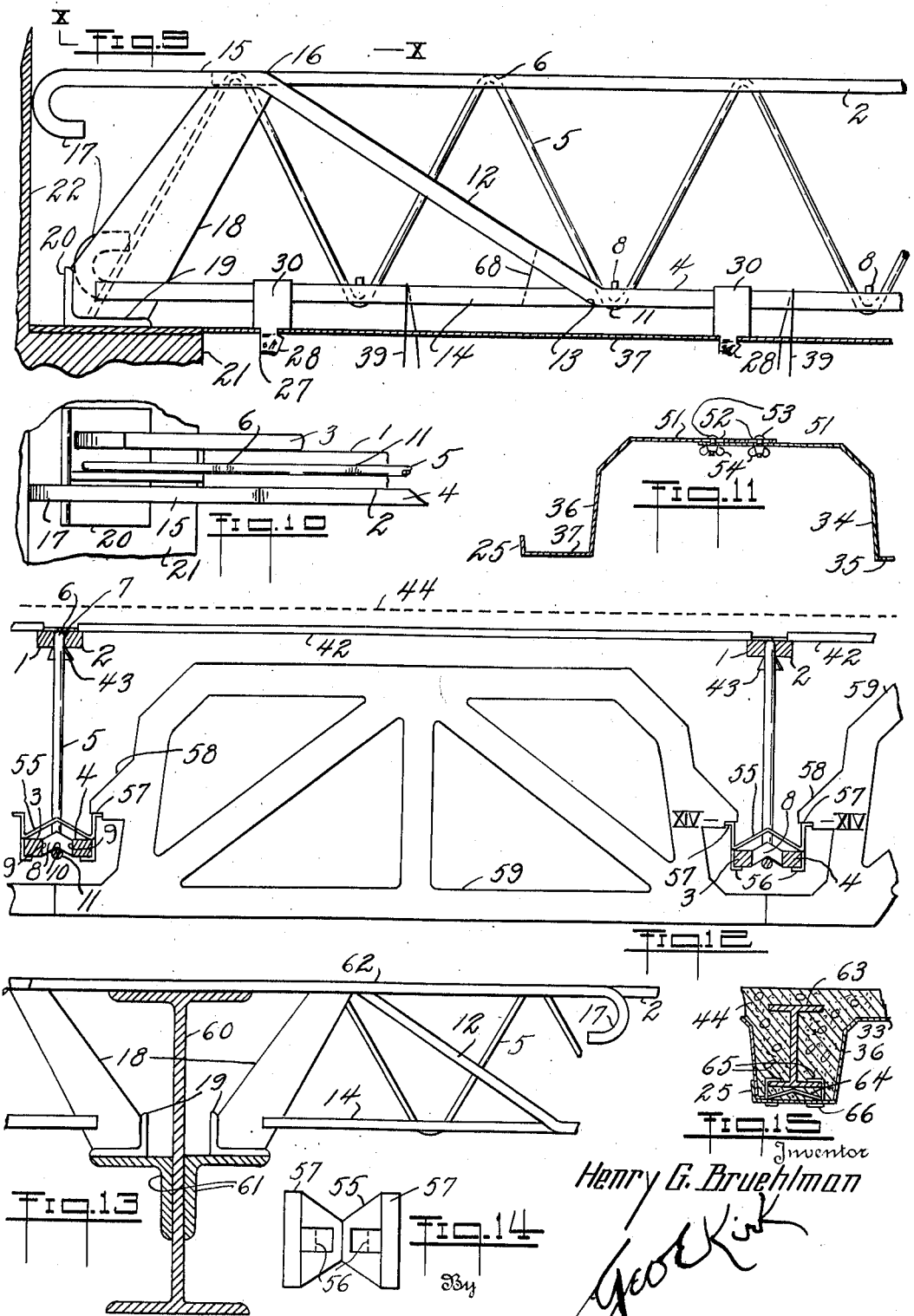

2,191,828

UNITED STATES PATENT OFFICE 2,191,828

SUSPENDED CONSTRUCTION

Henry G. Bruehlman, Toledo, Ohio

Application April 25, 1938, Serial No. 204,110

3 Claims. (Cl. 72—66)

This invention relates to form or mold assembly for poured construction.

This invention has utility when incorporated in bar joists and rib slab floor or ceiling construction of reinforced concrete as for bridges, docks, floors, and roofs.

Referring to the drawings:

Fig. 1 is a section spaced some distance from the supporting end of the wall and as extending in rib slab construction from the side wall showing the bar joists or skeleton and pan form therewith;

Fig. 2 is a detail view of a channel or pan on a reduced scale and as adapted for the construction of Fig. 1;

Fig. 3 is a perspective view of the pan trough mounting clip means adapted to engage with the bar joist skeleton;

Fig. 4 is a view on the line IV—IV, Fig. 2, looking at the end of this flare channel;

Fig. 5 is a section on the line V—V, Fig. 1, showing the spacer between a pair of bar joist skeletons and the overlapping registry between a pair of the channels or pans of the form;

Fig. 6 is a view of the pans in a slab floor section similar to Fig. 5, wherein the pans instead of smooth or flat are corrugated to supplement stiffness and such may or may not be left in the finished construction;

Fig. 7 is a detail view showing features of the assembly of the pan or channel with a bar joist skeleton, whereby the assembly set-up may be upward from the bar joists, thereby avoiding necessity for sub-structure or making it convenient for over water installation;

Fig. 8 is a view similar to Fig. 6, wherein the reinforcement for the channel or pan, instead of being corrugated, is by angle iron, welded or otherwise anchored therewith;

Fig. 9 is a side elevation on the line IX—IX, Fig. 1, showing features of the bar joist skeleton;

Fig. 10 is a view of the end support portion of the bar joist from the line X—X, Fig. 9;

Fig. 11 is a view of the channel section of adjustable width to accommodate variance between the spacings for the bar joists;

Fig. 12 is a view similar to Fig. 1 of the bar joist skeleton wherein, in lieu of pans, a molded fireproof form say of gypsum block is carried thereby in place for mold;

Fig. 13 is an adaptation of the bar joist skeleton as from a girder, say of I-beam type, with the feature of the upwardly extending truss member of the bar joist continuous over the girder to stagger or break joints therewith and effective to distribute negative stress;

Fig. 14 is a plan view of the clip means for holding the gypsum block on the line XIV—XIV, Fig. 12; and Fig. 15 is a detail view of the pan carrying clip means as adapted to another shape as I-beam construction instead of girder skeleton or concrete reinforcement as shown in Fig. 1.

In carrying out the invention herein, parallel rods 1, 2 (Fig. 12) form the top portion of the girder skeleton, with companion parallel rods 3, 4, therebelow as the lower portion of the girder.

In this instance, these rods are shown as rectangular. Therebetween zig-zag rod 5 has upper bends 6 with direct weld anchorage 7 spacing the rods 1 and 2. Spreader saddle 8 between the rods 3, 4, has weld anchorage 9 with each thereof, and weld anchorage 10 with the bend 11 of the zig-zag rod 5. This construction makes up the general assembly for the bar joist form.

In the carrying out of this invention, importance resides in providing end support for joist lower portion. Additionally, there is attained truss advantage. To this end, one of the lower bars, say bar 4 short of the end of the girder, has upward extension 12, while at such portion weld 13 assembles spacer extension 14 to carry out this continuity for the bar 4 to the support. However, this upward truss forming portion 12, as coming to the range of the rods 1, 2, may have portion 15 with weld assembly 16 therewith. The normal rod termini as toward the end support may have inward hook portions 17. Additionally, from this portion 15 and assembled by the weld 11, there may be depending plate 18 to have weld assembly 19 with angle iron 20 as a plate for this support to rest on wall 21, say at the side of building 22. This may be terminal support or beam according to where or how the building or construction is under way.

These bar joist skeletons may be located as desired to span between girders or other supports. From point of starting, say building wall 22 (Fig. 1) there may be initial trough section, herein shown as having wall abutting flange 23 with base or trough portion 24 and upstanding flange 25 to form the seat. This trough section has opening 26 (Fig. 2) therethrough, into which may be inserted extensions 27 (Fig. 3) to have wing 28 flexed or bent to key this clip means therewith. This clip means has gable-forming spanning portion 29 with riser portions 30 therefrom to terminal claws 31, 32, remote from the claws 27. For this trough section 24 as having this clip means 30 assembled therewith, the claws 31, 32, may be in opposed anchoring position over the rods 3, 4, thus supporting this channel section.

From this position as a start, a major channel having intermediate web or panel portion 33 with depending supporting leg 34 to stop flange 35, has parallel thereto companion leg 36 with trough portion 37 therefrom to terminate in flange 25 for a seat. This channel section may thus have clip means 30 assembled by the flexed ears 27 with the channel portion 37 brought into engagement position with the joists (Fig. 7) and then with claw 32 engaging, claw 31 may be bent and thus support this free side or channel leg 36 as channel leg 34 drops down to have its flange 35 register with the seat 25. There is thus a self-supporting suspended form effected of sufficient stability for the workmen to continue, in this horizontally extending construction, laying of forms effective from the upper side. Furthermore, the support is sufficient to carry the pour for the load. In this type of set-up the various openings 26 may not only provide clearance space for the claws of the clip means but may provide extension means as for supporting line shafts, pipes or conduits as may be desired. Furthermore, supplemental openings 38 in the trough section of the channel permit insertions of wires 39 (Fig. 9) as laced over the rods 3, 4, and to protrude therebelow as holding means, say for sub-construction whether metal lath, fiber board, or other ceiling construction.

In this set-up for these bar joist skeletons the pan lower portions or troughs are efficient in maintaining the spacing at such region. However, as thereabove slots 40 through a few of the bends 6 of the zig-zag rod 5 may receive tongue 41 of upwardly open channel 42 as a stiffener bar which, as inserted through the opening 40, may have free end 43 therefrom twisted to key this assembly of the stiffening bar. The stiffening bar may extend from bar joist to bar joist or be an extension therebeyond. As concrete 44 is poured, this stiffening bar is a slab reinforcement therein as is also the bar joist skeleton.

In selecting the set-up, say as toward an end wall or terminus for a bar joist, an increase in the cross-section of the concrete may be in order, not only as to the floor slab but as to the joist portion. To effect such end, the terminal pan or terminal portion of a pan, instead of being symmetrical throughout as section 45 (Fig. 2), may have widening flange 46 to care for an extension of the seat 25. This increase as to the slab is by inclined portion 47.

Straight pan portions 45, as laid in general assembly, may have variance in total longitudinal extent to be cared for in general construction or job work. To this end, such portions 45 have flange 25 with short terminus 48 (Fig. 5) allowing interfitting between the pan sections as telescopic instead of nicety required for butt joint assembly. In the stiffening of the pan as against distortion out of shape, corrugations 49 may be stepped or approximately continuous, and be as a resultant form to be left in the mold or to be removed therefrom. In removal, it is only necessary to flex the claws 28 back to clear the openings 26 and thus allow the pans to be dropped off and leave the concrete reinforcement set as a fully formed construction. In lieu of the corrugations, angle iron 50 (Fig. 8) may have weld assembly with smooth pan panel not only as to the web portion but the leg portions thereon. In adapting this construction to variance between the spacings for the girder, the pan may have sectional web portions 51 (Fig. 11) with slots 52 therein engaging bolts 53 having wing nuts 54 thereby adjusting the spacings between the respective legs 34, 36.

With this skeleton bar joist, in lieu of the pans, clip adaptation may embody supporting span portion 55 (Fig. 12) with claws 56 engaging the rods 3, 4, and supplemental claws 57 outwardly as ledges to catch under ears 58 as gypsum blocks 59 as mold section and spanner between bar joists.

This bar joist is adaptable to girder construction, say of the type of I-beam 60 (Fig. 13), herein shown as having brackets 61 as supports for the plates 20. Herein instead of the truss 12 stopping at the section 15 as rising toward the upper bars 1, 2, such may advantageously have continuing portion 62 across the girder portion 60 to have terminal hook 17 anchor into the concrete well away from the girder and thus distribute even negative stresses for strengthening the structure as across the girder.

The pan construction as to the feature of the clips may be assembled with girder 63 (Fig. 14) instead of skeleton type of girder. In this instance, clip means has span portion 64 with upper claws 65 engaging the flanges of the I-beam 63 and depending claws 66 to be flexed and holding the trough portion 37 of the pan channels. In this type of general disclosure with the spacing downward from the flanges of the I-beam 63 as well as from the rods 3, 4, in the skeleton girder, there is clearance for the pour as a protective body in enhancing the fire resistant properties of the resultant structure. In the disclosed bar joists before the concrete is set, the joist acts as a structural steel truss. After the concrete is set, the steel bars form a bond with the concrete with the bottom bars acting as a truss of reinforcing steel in a so-called rib slab construction. Furthermore, the plate as located serves as a bearing shoe along the bottom cord. The cross-section of the rods or bars being uniform, there is enhanced value as an efficient reinforcement construction in a shape economically and readily produced in normal merchant dimensions of established tensile and shear strengths. In the cross-over construction wherein the truss-effecting bottom bar or rod is carried up to the upper bar and then over an intermediate girder, there is resistance to internal shear as well as effective action against negative bending moment. The riser plate 18 from the angle plate 20 is also effective against shear near the support.

The disclosure herein, as being readily set up from the positioning of the girders and thereover, avoids staging and sub-work as well as eliminates the practice of shoring or soffits.

The commercial advantages herein not only relate to avoidance of sub-structure such as shores and soffits, as well as investment and set up therefor, but there are economic set ups in the pans or channels for the mold or concrete cast. Additionally, the bar joist skeleton involves rods economically produced and efficient in their assembly for great load strain per pound of material therein. This means efficiency or low cost per lineal foot of the bar joist skeleton as to the strength or span adequate therefor. It means low investment cost in molds which may be re-used as to the pans or channels. It means accuracy in quick set-up for conforming to architectural dimensions independently of special constructions therefor. It means the full range of adaptations for floor or ceiling purposes, even to the support of special equipment therebelow or even thereabove in the event it be the purpose to carry reinforcement through the slab upward from the bars 1, 2. These reductions in material and labor multiply in advantage in completing an installation as against the carrying thereupon of insurance and tax. Accordingly, there is efficient basis per square foot or on floor slab dimension or other areas in working matter through.

The extensions 27 (Fig. 3) are shown as having ports or holes 87 therethrough which may serve as nail holes for mounting an anchor or cleat therebetween, say a wooden board to receive nails or anchoring means for a fiber board or other type of ceiling to be supported.

Supplemental to the weld 13 (Fig. 9) as assembly between the bar section 14 and a truss bar section 12, there may be plate 68 as additional reinforcement in this weld assembly. While in purpose the bar 42 is primarily a spacer, the reinforcement for the slab is primarily effected by wire mesh 69.

What is claimed and it is desired to secure by Letters Patent is:

1. Horizontally extending construction comprising reinforcing bar joist skeltons in parallel, downwardly open channel means having one leg terminating in a trough and the other leg of the channel terminating in a stop, and clip means from the trough adapted to engage a skeleton thereby to hold the channel at the trough in position as to the skeletons as the companion leg of the channel is shifted to have its stop rest in the trough as at an adjacent skeleton.

2. Horizontally extending construction comprising reinforcing bar joist skeltons in parallel, downwardly open channel means having one leg terminating in a trough and the other leg of the channel terminating in a stop and clip means from the trough adapted to engage a skeleton thereby to hold the channel at the trough in position as to the skeletons as the companion leg of the channel is shifted to have its stop rest in the trough as at an adjacent skeleton, and spacer means between the skeletons positioning clear of the channel means.

3. Horizontally extending construction comprising reinforcing bar joist skeltons in parallel, downwardly open channel means having one leg terminating in a trough and the other leg of the channel terminating in a stop, and clip means from the trough adapted to engage a skeleton thereby to hold the channel at the trough in position as to the skeletons as the companion leg of the channel is shifted to have its stop rest in the trough as at an adjacent skeleton, said channel trough having openings therein, said clip means extending through the openings and flexed to key assembly with the trough and protruding thereabove for engagement with the skeleton.

HENRY G. BRUEHLMAN.